US007287952B2

(12) United States Patent
Ricci et al.

(10) Patent No.: US 7,287,952 B2
(45) Date of Patent: Oct. 30, 2007

(54) FEEDER LOAD AUTOMATION SYSTEM AND METHOD OF USE

(75) Inventors: Robert R. Ricci, Downingtown, PA (US); J. Edward Roth, Lansdale, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 301 days.

(21) Appl. No.: 10/624,649

(22) Filed: Jul. 23, 2003

(65) Prior Publication Data

US 2005/0029169 A1 Feb. 10, 2005

(51) Int. Cl.
*B65G 59/02* (2006.01)

(52) U.S. Cl. .............................. 414/796.6; 414/796.7; 414/769.9; 414/797; 414/797.2; 414/797.3; 414/928; 414/929

(58) Field of Classification Search ............ 414/796.6, 414/796.7, 796.8, 796.9, 797, 797.2, 797.3, 414/927, 928, 929, 795.9, 796.2, 796.5
See application file for complete search history.

(56) References Cited

U.S. PATENT DOCUMENTS 3,095,193 A * 6/1963 Sorenson ..................... 271/42
3,780,884 A * 12/1973 Jones ......................... 414/793
3,937,336 A * 2/1976 Carlson ................... 414/788.8
4,119,219 A * 10/1978 Marschke ................... 414/796
4,979,870 A * 12/1990 Mojden et al. .......... 414/788.4
5,096,367 A 3/1992 Winski
5,096,370 A * 3/1992 Mohr ...................... 414/789.1
5,108,255 A 4/1992 Cornacchia
5,193,973 A 3/1993 Tübke
5,222,857 A * 6/1993 Hasegawa ................ 414/788.4
5,242,262 A * 9/1993 Andre et al. ................ 414/796
5,256,028 A 10/1993 Winski et al.
5,368,678 A * 11/1994 Miyamoto et al. ....... 156/405.1
5,427,252 A * 6/1995 Teegarden et al. .......... 209/540
5,562,403 A 10/1996 Winski
5,630,695 A * 5/1997 McDonnell .............. 414/751.1
5,700,128 A * 12/1997 Tonnigs et al. .......... 414/789.1
5,788,461 A 8/1998 Easton et al.
5,899,659 A 5/1999 Beilsmith
5,913,655 A 6/1999 Maday
5,957,653 A * 9/1999 Nishitani et al. ........ 414/790.9
6,152,682 A * 11/2000 Araki ..................... 414/796.5
7,007,942 B1 * 3/2006 Stearns et al. ................ 271/11

* cited by examiner

*Primary Examiner*—Douglas Hess
(74) *Attorney, Agent, or Firm*—Greenblum & Bernstein, P.L.C.

(57) ABSTRACT

A feeder load automation system and method of use including a lifting device capable of lifting a pallet of bundled product from a lowered positioned to a raised position and a platform positioned on the lifting device which holds the pallet of bundled product. A head mechanism having a holding device lifts a top layer of bundled product from the pallet to provide a separation space between the top layer of bundled product and a next, lower layer of bundled product or the pallet. A conveyor mechanism, extendible into the separation space, conveys the top layer of product away from the pallet. An input and takeaway station are also provided.

20 Claims, 4 Drawing Sheets

FEEDER LOAD AUTOMATION SYSTEM AND METHOD OF USE

BACKGROUND OF THE INVENTION

1. Field of the Invention

The invention generally relates to a feeding mechanism and method of use and, more particularly, to a mechanism for loading and feeding mail objects such as letters, packages and flats to a sorting mechanism for future sorting of such mail objects.

2. Background Description

The sorting of mail and other types of objects or products is a very complex, time consuming task. In general, the sorting of mail objects such as letters and flats are processed though many stages, including back end processes. In the back end processes, the mail objects are sorted and then sequenced into a delivery point sequence for future delivery to specific delivery point addresses. The sorting and sequencing processes can either be manual or automated, depending on the mail sorting facility, the type of mail object to be sorted such as packages, flats, letters and the like. A host of other factors may also contribute to the automation of mail sorting and sequencing, from budgetary concerns to modernization initiatives to access to appropriate technologies to a host of other factors.

In general, most modern postal and other types of mail handling facilities have taken major steps toward automation by the implementation of a number of technologies. These technologies include, amongst others, letter sorters, parcel sorters, advanced tray conveyors, flat sorters and the like. As a result of these developments, postal facilities and other handling facilities have become quite automated over the years, considerably reducing overhead costs. But, there are still some processes that are performed manually, which are very time consuming and adds to the general overhead of the facility.

By way of one example, a large individual cost of the mail handling system, i.e., processing, transportation and delivery, is the sorting and sequencing of the mail objects such as flats. To sort and sequence the mail objects, the mail objects such as flats have to first be loaded on the sorter mechanism from a pallet or other type of holding container. To accomplish this task, for example, a pallet of bundled flats is manually broken down or unloaded so that each bundle can be lifted onto a staging area. The bundles are then broken down into their constituent components, i.e., individual flats. The flats are then conveyed through the sorting mechanism for sequencing in delivery point sequence for future delivery or warehousing.

Because this process is performed manually, delays in sequencing may occur, in addition to the facility incurring large overhead costs for the manual labor. Also, it is not unusual for large staging areas to be required in order for the bundles to be unloaded and then broken down into their constituent parts. This added floor space is also an expensive overhead cost.

The invention is directed to overcoming one or more of the problems as set forth above.

SUMMARY OF THE INVENTION

In a first aspect of the invention, a feeder load automation system includes a lifting device capable of lifting a pallet of bundled product from a lowered positioned to a raised position and a platform positioned on the lifting device which holds the pallet of bundled product. A head mechanism having a holding device lifts a top layer of bundled product from the pallet to provide a separation space between the top layer of bundled product and a next, lower layer of bundled product or the pallet. A conveyor mechanism, extendible into the separation space, conveys the top layer of product away from the pallet when the top layer of bundled product is lowered thereon.

In another aspect of the invention, an apparatus includes a mechanism for lifting a pallet of bundled product between a lowered position and a raised position and a mechanism for providing a separation space between a top layer of the bundled product and an adjacent lower layer of bundled product or the pallet. A mechanism is provided for transporting the top layer of the bundled product from the pallet to a sorting device.

In another aspect of the invention, a method of feeding product is provided which includes placing a pallet onto a lifting platform and lifting the pallet to a height such that a top layer of bundled product on the pallet is higher than a conveyor system. A separation space is created between the top layer of bundled product and a lower next layer of bundled product or the pallet. The top layer is dropped onto a conveyor mechanism and transported towards an induction area of a sorter feeding mechanism.

DETAILED DESCRIPTION OF EMBODIMENTS OF THE INVENTION

The invention is directed to a mechanism for loading and feeding mail objects such as letters, packages and flats to a sorting mechanism for future sorting of such mail objects. The invention provides for a fully automated system and process for moving standardized flat bundles, for example, from arrival pallets or containers directly to a sorter feed table. In one embodiment, the system and process is directed to the feeding of bundled flats to induction stations of flat feeders. The system includes, in one embodiment, a process for depalletizing flat bundles or other mail objects, in addition to a mechanism and process for transporting the flat bundles to appropriate flat feeders, i.e., induction stations or decks of the flat feeders. By using the system and method of the invention, considerable overhead costs, manual labor and the like are reduced. Other applications such as warehousing and storage applications are also contemplated for use with the invention.

System of the Invention

Figure 1:
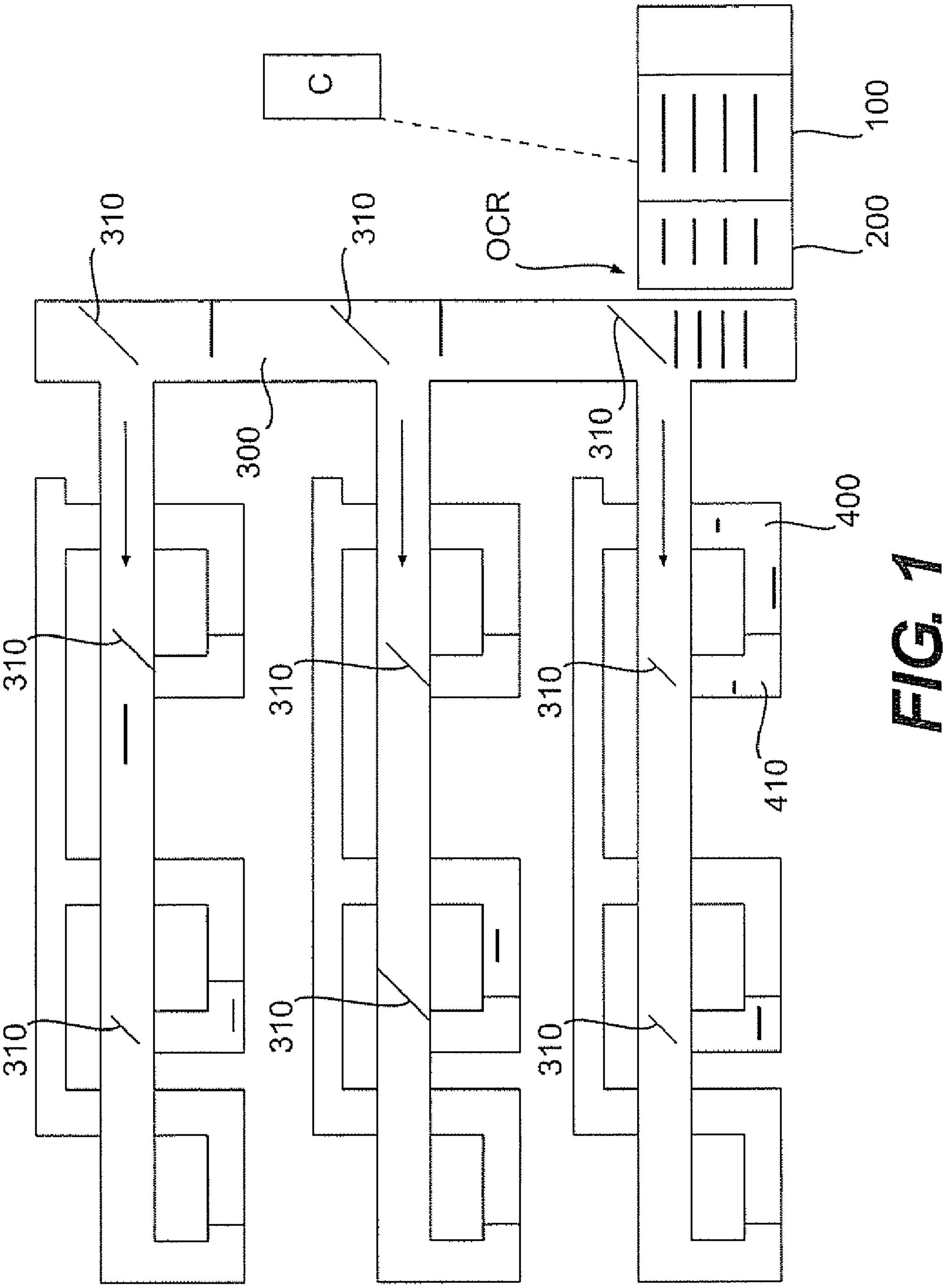
FIG. 1 shows a general schematic diagram of a feeder load automation system in accordance with the invention.

FIG. 1 shows an overview of the system in accordance with the invention. In general, the system includes a depalletizer 100, a staging conveyor 200 and a distribution conveyor system 300. A single or separate controllers as represented generally by controller "C" may control the depalletizer 100, staging conveyor 200 and distribution conveyor system 300. A bar code reader or an optical recognition system such as an optical character recognition "OCR", may be implemented to read bar code labels provided on the mail objects for diverting the mail objects to any one of a plurality of input feeders 400, each having an induction station 410. In one embodiment, the input feeders 400 are in communication with the distribution conveyor system 300 such that flats may be diverted to individual input feeders via diverters 310. The diverters 310 may be each individually controlled and moved, i.e., pivotable, by any well-known mechanism. In one embodiment, the diverters 310 are controlled by the controller "C" based on a signal received from the bar code reader or "OCR", i.e., depending on the information read from the bar code label.

Figure 2:
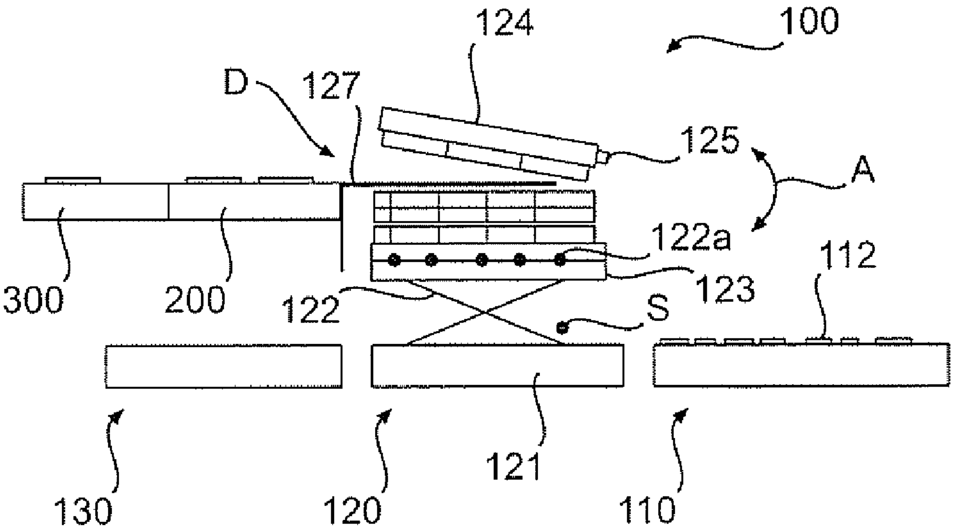
FIG. 2 shows a staging area of the feeder mechanism in an aspect of the invention.

FIG. 2 shows the depalletizer system. The depalletizer 100 is designed to intake pallets of mail objects such as bundles of flats, remove or separate the bundles from the pallet and position such bundles on a conveyor for future sorting. In one embodiment, the depalletizer 100 includes a pallet input station 110, a depalletizer subsystem 120 and a pallet stacker 130. The pallet input station 110, in one embodiment, is a conveyor having rollers or a belt driven system, designed to accommodate a pallet containing multiple layers of alternate direction mail bundles. The bundles are preferably of consistent size, laid in one direction per layer, alternating by 90 degrees.

Still referring to FIG. 2, the depalletizer subsystem 120 includes a stand 121, a lift device 122 and a pallet lift conveyor 123, provided on the lift device 122. It should be readily recognized by those of ordinary skill in the art that the lift device 122 may be any known lift mechanism such as a scissors-type lift mechanism, pneumatic or hydraulic cylinder/piston assembly, a linear actuator, a chain or belt driven mechanism or the like. The pallet lift conveyor 123 is capable of rotating, as designated by arrow "A". By way of one example, in a lowered position, the pallet lift conveyor 123 may rotate 90 degrees, if necessary, so that short ends of the bundles on the top layer of bundles on the pallet (placed on the pallet input station 110) will face the staging conveyor 200. This rotation may be effected by a gear system, a belt and gear system or other known mechanisms "R". Additionally, in one embodiment, the lift device 122 may provide a range of motion between the pallet input, e.g., lowered position, to approximately one bundle height above the staging conveyor 200. In this lowered position, rollers or other conveyance 112 of the pallet input station 110 and/or the pallet lift conveyor 123 will become activated, via the controller "C" to transport the pallet onto the pallet lift conveyor 123. The conveyor system of the depalletizer subsystem 120 is represented generally as reference numeral 123*a*. The controller may receive a signal from any known sensor "S", for example, a motion sensor, a photo sensor or the like, or may be activated by a position of the depalletizer, itself, when in the lowered position.

The depalletizer subsystem 120 further includes a tilt head 124, which may be hinge mounted to the pallet lift conveyor 123 by a hinge 125 or mounted in another conventional manner. The tilt head 124 is moveable, i.e., tilted, to a drop down position onto a top layer of bundles on the pallet lift conveyor 123 when the depalletizer subsystem 120 is in the upper or raised position. The tilt head 124 includes a grabbing or other type of holding mechanism 126, which is designed to hold and lift the top layer of bundles (FIG. 4) in order to provide a separation space between layers of the bundles positioned on the pallet lift conveyor 123. A separator/conveyor 127, another part of the depalletizer subsystem 120, is designed to move into the separation space between the bundle layers, as shown in FIG. 2. In case of a last bundle, the separation space will be between the last bundle layer and the pallet.

The separator/conveyor 127 is designed to move across substantially an entire portion of the bundles within the separation space. When the separator/conveyor 127 is properly positioned, determined by an actuator, sensor, motion detector (each of which may be generally designated "D") or a predetermined travel distance, the upper layer of bundles will then be positioned on top of the separator/conveyor 127. The order of bundles will remain in substantially a same order as they were positioned on the pallet. The separator/conveyor 127 then begins backward movement so that he bundles can be transported onto the staging conveyor 200. Moving the separator/conveyor 127 backwards can be performed while the staging rollers on the separator/conveyor 127 deposit the full layer of the bundles on the staging conveyor 200.

The pallet lift conveyor 123 may then rotate 90 degrees so that the next layer of bundles will have its short ends facing the staging conveyor 200. The depalletizer subsystem 120 begins the same cycle again for the next pallet layer of bundles by rising to about a layer of bundles above the staging conveyor 200. When the pallet has been fully unloaded, the pallet lift 124 will drop and its conveyor system will be activated to move the now empty pallet onto the pallet stacker 130.

Figure 3:
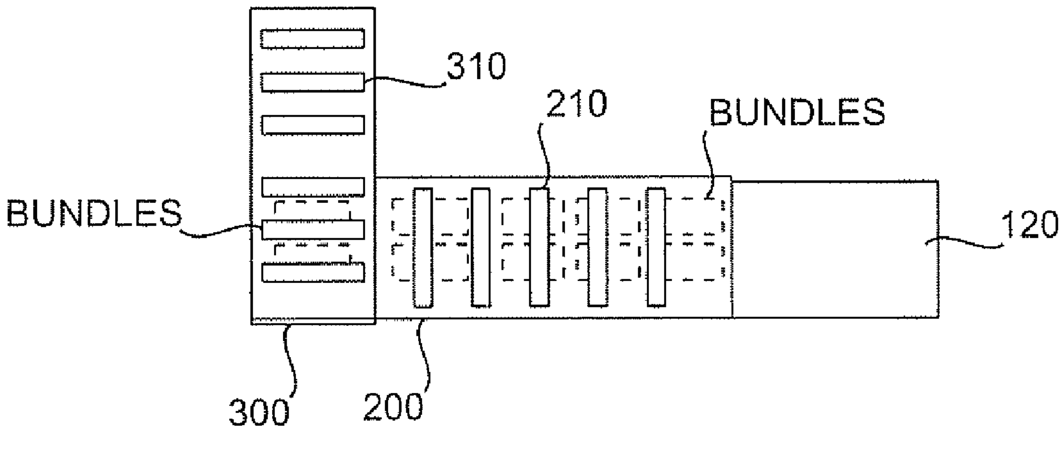
FIG. 3 shows a top view of the system of the invention.

FIG. 3 shows a top view of the system of the invention. The staging conveyor 200 is a roller or other type of conveyor, generally depicted as reference numeral 210. In the roller configuration, the staging conveyor 200 has the ability to power each set of rollers 210 individually, for example. This allows the movement of one set or group of bundles from the staging conveyor 200 to the distribution conveyor 300. In this embodiment, the distribution conveyor 300 is positioned substantially orthogonal to the staging conveyer 200. In this manner, bundles from the staging conveyer, with their short ends facing the distribution conveyor 300, will be reoriented on the distribution conveyor 300. That is, the bundles will now be traveling in the direction of their long ends. It should be readily recognized that each turn of the system may also reorient the bundles in a like manner.

Starting conveyor activation of the distribution conveyor 300, each group of bundles will be separated from one another. The first group of bundles, closest to the distribution conveyor 300, one-by-one, will be advanced onto the distribution conveyor 300, via the conveyance mechanism 210. As these bundles are moved down the distribution conveyer 300, the next group of bundles will be advanced from the staging conveyor 200 onto the distribution conveyor 300, and so on. As space is available on the staging conveyor 200, closest to the depalletizer subsystem 120, the next layer of bundles will be advanced onto the staging conveyor 200 via the separator/conveyor 127.

Still referring to FIG. 3, the distribution conveyor 300 is, in one embodiment, a roller conveyor which has the ability to power each set of rollers individually. The rollers are generally depicted as reference numeral 310. With this capability, each bundle loaded on the distribution conveyor 300 from the staging conveyor 200 can be singulated (moved separately) into the rolling sections of the distribution conveyor.

Figure 4:
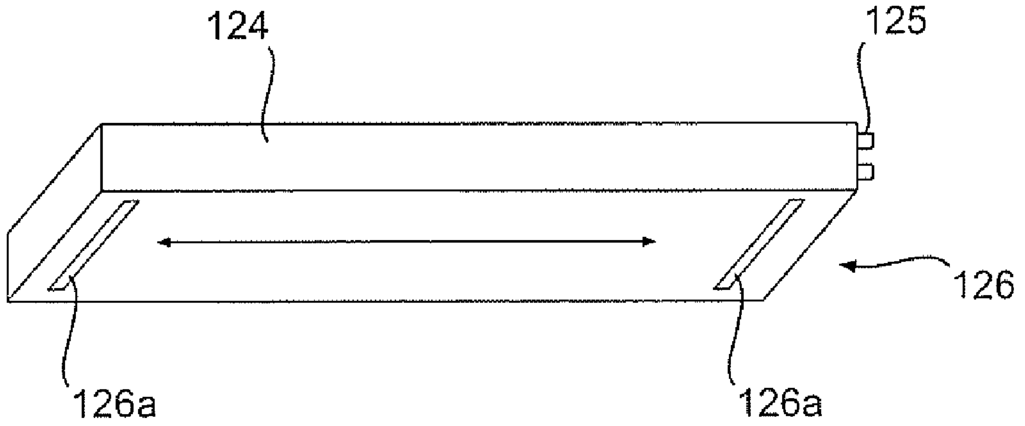
FIG. 4 shows a bottom view of a tilt head mechanism in accordance with the system of the invention.

FIG. 4 shows a bottom view of the tilt head 124. In this view, the holding mechanism 126 is shown which, in one embodiment, may include opposing arms 126*a*, hydraulically, pneumatically or electrically moveable between an open position and a closed position. In the open position, the tilt head 124 is capable of dropping down over a top layer of bundles on the pallet. Once in this position, the arms 126 are activated to move inwardly towards one another in order to capture or grab the top layer of bundles on the pallet. The arms 126 will be forced together to such an extend that they will "squeeze" together the top layer of bundles with such force, allowing for the tilt head to lift the top bundle.

In another embodiment of FIG. 4, reference numeral 126*a* can equally represent a vacuum source, for example. The vacuum source is capable of lifting the top layers of bundles by a suction force. Upon deactivation of the suction force, the top layer of bundles can be released onto the separator conveyor 127. As with the arm mechanism, one of ordinary skill in the art can easily determine the required force or suction required to lift a top bundle of layers, depending on the weight of the bundle. Also, in each of these embodiment, due to the lifting of the top bundles, damage to the lower bundles are minimized during the transport process.

Figure 5:
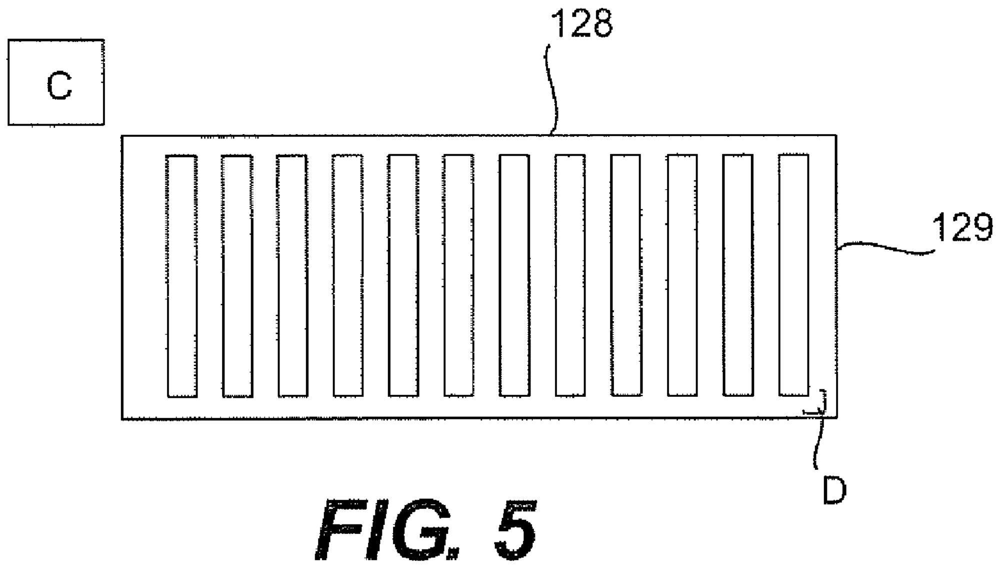
FIG. 5 shows a schematic of a separator/conveyor in accordance with the system of the invention.

FIG. 5 shows a schematic view of the separator/conveyor 127. In this view, the separator/conveyor 127 includes an arm portion 128 having rollers or other conveying mechanism 129. The arm 128 is designed to extend into the separation space provided by the tilt head and the conveyor mechanism 129 is designed to transport the top layer of bundles onto the staging conveyor 200 (once the top layer of bundles are positioned on the conveyor). The controller "C" may control the separator/conveyor 127, as with the other components. The arm 128 may be retracted and extended by any known mechanism such as by rotation, sliding, etc.

Method of Feeding Flats of the Invention

Figure 6:
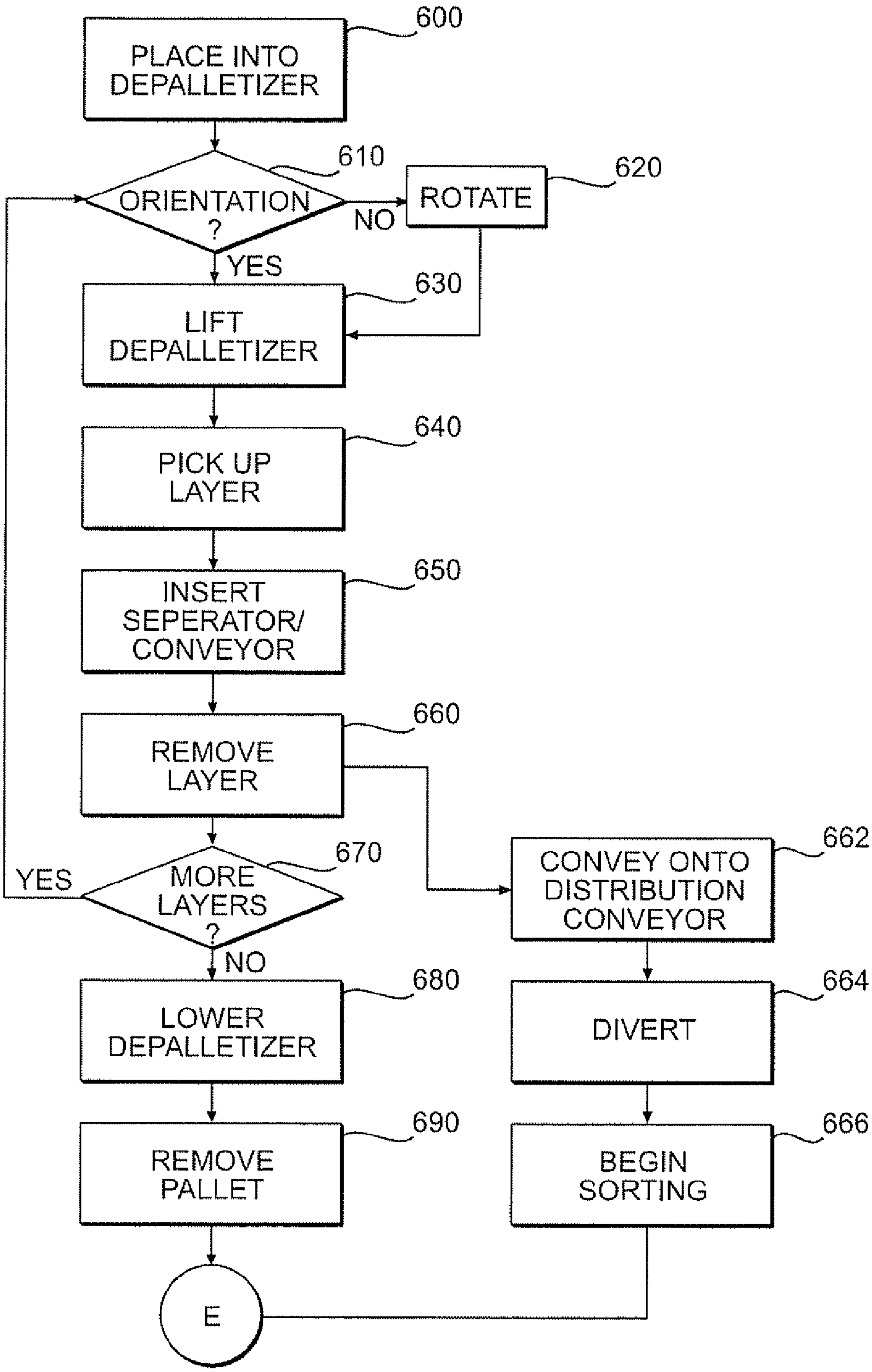
FIG. 6 is a flow diagram showing the steps of implementing the methods of the invention.

The system of the invention, in one aspect, feeds the mail objects from a pallet or holding container to an induction area of a plurality of input feeders for future sorting and sequencing. FIG. 6 is a flow diagram showing the steps of implementing the methods of the invention. The steps of FIG. 6 may be implemented via the controller "C", and may equally represent a high level block diagram of the controls of the invention.

In step 600, a pallet is loaded on the depalletizer from the input station. In step 610, a determination is made as to whether the short ends of bundles are facing the staging conveyor. If the short ends are not facing the conveyor stage, in step 620, the depalletizer will rotate in step 630. In step 630, the depallitizer is lifted to about one bundle layer above the staging conveyor. In step 640, a layer of bundles is lifted so that, in step 650, the separator/conveyor can be inserted within the separation space. The top layer of bundles is then positioned on the separator/conveyor and transported to the staging conveyor, in step 660.

In step 670, a determination is made as to whether any more layers of bundles are present on the pallet. This determination may be performed by a weight sensor, photo sensor or a predetermined distance of lift programmed into the controller or otherwise of the depalletizer, for example. In the latter instance, the bundles would be stacked to a known height, which is preprogrammed into the controller "C", to determine the lift distance needed for the last layer of bundles to be about higher than the separator/conveyer, i.e., a top surface of the pallet. If there are bundles present, the process will return to step 610. Prior to the rotation, in one aspect, the depalletizer will be slightly lowered so that the conveyor/separator does not interfere with the rotation thereof. If there are no more bundles present, the depalletizer will then be lowered, in step 680, and the empty pallet will be removed onto the pallet stacker, in step 690. The process then ends; however, if further pallets are present, the process may begin again at step 600.

Simultaneously, as the separator/conveyor begins backward movement and the pallet lift rotates so that the next layer of bundles will have the short ends facing the staging conveyor, the unstacked bundles will be conveyed or transported to the distribution conveyor, in step 662. In step 664, the bundles will be diverted, according to bar coded information or the like, to a particular induction area of one of the input feeders. The sorting process will then begin in step 666. The method ends at "E".

While the invention has been described in terms of embodiments, those skilled in the art will recognize that the invention can be practiced with modification within the spirit and scope of the appended claims.

We claim the following:

1. An apparatus, comprising:
- a lifting device capable of lifting a pallet of bundled product from a lowered position to a raised position;
- a platform positioned on the lifting device holding the pallet of bundled product, the platform being rotatable to orient the bundled product into a first orientation from a second orientation;
- a hinged tilt head mechanism having a holding device for lifting a top layer of bundled product in the first orientation from the pallet to provide a separation space between the top layer of bundled product and a next, lower layer of bundled product on the pallet; and
- a conveyor mechanism, extendible into the separation space, which conveys the top layer of product away from the pallet when the top layer of bundled product is lowered thereon.

2. The apparatus of claim 1, wherein the bundled product is mail objects.

3. The apparatus of claim 2, wherein the mail objects are flats.

4. The apparatus of claim 1, further comprising a control system for controlling at least the lifting device, the platform, the head mechanism and the conveyor mechanism.

5. The apparatus of claim 1, further comprising one of a bar code reader and optical recognition system for reading labels on the bundled product.

6. The apparatus of claim 1, further comprising an input station, adjacent to the platform when in a lowered position, wherein at least one of the input station and the platform include a conveyor device which conveys the pallet from the input station to the platform when the platform is in a lowered position.

7. The apparatus of claim 1, further comprising a distribution conveyor downstream from the conveyor mechanism, the distribution conveyor including at least one diverter for diverting the bundled product to one of a plurality of input feeders.

8. The apparatus of claim 7, wherein the at least one diverter is controlled by a controller and the distribution conveyor is positioned substantially orthogonal to the conveyor mechanism.

9. The apparatus of claim 1, wherein the lift device includes a sensor or actuating system to determine a height of the lift mechanism and a load on the pallet.

10. The apparatus of claim 1, further comprising a pallet stacker, the platform including a conveying mechanism which places empty pallets on the pallet stacker when the platform is in a lowered position.

11. An apparatus, comprising:

a lifting device capable of lifting a pallet of bundled product from a lowered position to a raised position;

a plafform positioned on the lifting device holding the pallet of bundled product;

a head mechanism having a holding device for lifting a top layer of bundled product in a first orientation from the pallet to provide a separation space between the top layer of bundled product and a next, lower layer of bundled product on the pallet; and a conveyor mechanism, extendible into the separation space, which conveys the top layer of product away from the pallet when the top layer of bundled product is lowered thereon, wherein the head mechanism is a tilt head mechanism and the holding device is one of a vacuum source to produce a suction force and a pair of opposing arms moveable between a first position and a second, closer position to lift and lower the top layer of bundled product.

12. An apparatus, comprising:

means for lifting a pallet of bundled product between a lowered position and a raised position and rotating the bundled product into a first orientation from a second orientation prior to the separating;

means for providing a separation space between a top layer of the bundled product and an adjacent lower layer of bundled product or the pallet;

means for transporting the top layer of the bundled product, in a first orientation, separated from the adjacent lower layer of bundled product or the pallet, to at least one feeding device.

13. The apparatus of claim 12, wherein the separation means drops the top layer of bundled product onto the transporting means.

14. The apparatus of claim 12, wherein the separation means is one of a vacuum and moveable opposing arms capable of lifting the top layer of bundled product.

15. The apparatus of claim 12, wherein the bundled product is a bundle of flats.

16. The apparatus of claim 12, wherein the transportation means includes:

a conveyer positionable within the separation space; and a distribution conveyor having diverters which are moveable between a first position and a second position, the diverters capable of diverting the bundled product to any of the at least one feeding device based on information associated with the bundled product, wherein the conveyor conveys the bundled product away from the separation means and towards the distribution conveyor.

17. An apparatus, comprising:

a lifting device;

a rotatable platform positioned on the lifting device;

a hinged tilt head mechanism having a holding device for lifting a top layer of bundled product in a first orientation from a pallet to provide a separation space between a top layer of bundled product and a next, lower layer of bundled product on the pallet; and a conveyor mechanism, extendible into the separation space, which conveys the top layer of product away from the pallet when the top layer of bundled product is lowered thereon.

18. The apparatus of claim 17, wherein the tilt head mechanism is hinge mounted to the pallet lift conveyor by a hinge.

19. The apparatus of claim 17, wherein the holding device is a pair of opposing arms moveable between a first position and a second, closer position.

20. The apparatus of claim 17, wherein the lift device includes a sensor or actuating system to determine a height of the lift mechanism and a load on the pallet.

* * * * *